UNITED STATES PATENT OFFICE.

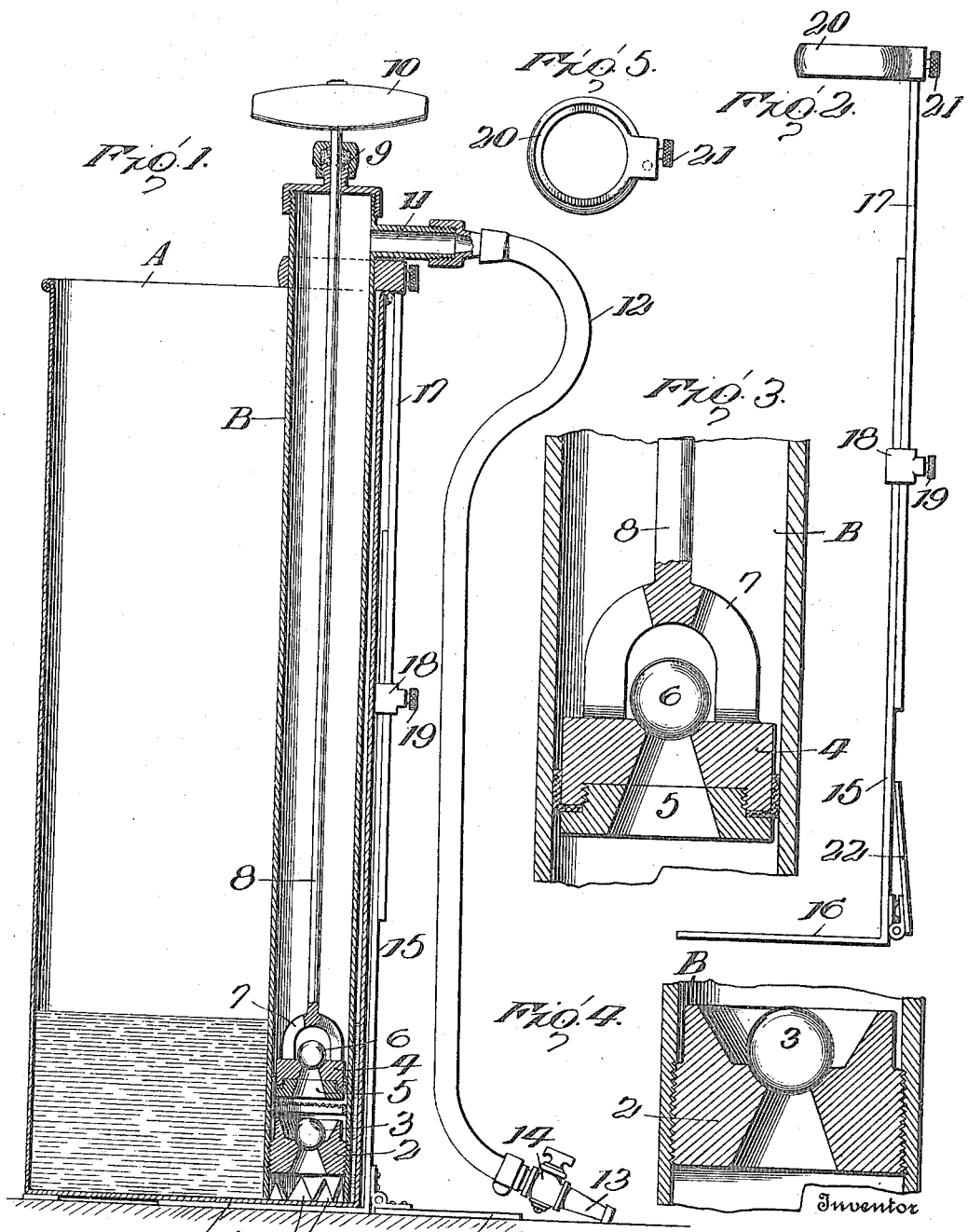

WILLIAM H. DILLEY, OF MUIR, MICHIGAN.

GREASE-PUMP.

1,208,515. Specification of Letters Patent. Patented Dec. 12, 1916.

Application filed June 4, 1915. Serial No. 32,142.

*To all whom it may concern:*

Be it known that I, WILLIAM H. DILLEY, a citizen of the United States, residing at Muir, in county of Ionia and State of Michigan, have invented certain new and useful Improvements in Grease-Pumps, of which the following is a specification.

This invention relates to an improvement in grease pumps or guns, and the object is to provide means which can be inserted into a can, pail or receptacle containing grease or oil for the purpose of removing the lubricant from the receptacle and conducting it to the parts to be lubricated.

The invention consists of certain novel features of construction and combinations of parts which will be hereinafter described and pointed out in the claims.

In the accompanying drawings:—Figure 1 is a longitudinal vertical sectional view of the invention; Fig. 2 is a view in elevation of the pump support; Fig. 3 is an enlarged detail view in section of the valve in the pump casing or cylinder; Fig. 4 is a detail of the foot valve, and Fig. 5 is a view of the clamp 20 at the upper end of the bar 17.

A, represents the receptacle or can containing the oil or grease, and B is the pump casing or cylinder extending through the top or cover of the receptacle.

The lower terminal of the casing B is provided with serrations or openings 1, through which the lubricant passes from the receptacle to the pump casing. A valve seat 2 is located at the lower end of the casing, and a ball valve 3 is seated thereon, to prevent the lubricant from flowing back into the receptacle after it has been drawn into the pump casing.

Mounted in the casing is a plunger or piston 4 which is provided with a central passage 5 through which the grease or lubricant may pass. A ball valve 6 is seated on the piston for normally closing the opening or passage 5. A yoke 7 is connected to the piston, which is in the form of a cage for maintaining the valve upon the piston and insuring its seating itself. A rod 8 is connected to the yoke or cage 7, which extends through the top of the casing and stuffing box 9, and a handle 10 is provided on the upper terminal of the rod whereby the rod and piston may be reciprocated.

A spout 11 is connected to the casing through which the lubricant is expelled from the casing. A hose 12 is removably connected to the spout and a nozzle 13 is connected to the hose. A valve 14 is provided in the nozzle for controlling the discharge of lubricant therefrom.

A support consisting of an upright 15 is provided with a projection or arm 16 which is adapted to be inserted beneath the receptacle. A bar 17 of the support is adjustably connected to the upright 15 by means of a clamp, such as a collar 18 and thumb-screw 19. The bar 17 is provided with a clamp 20 connected adjustably to the bar by means of a thumb-screw 21. The receptacle A is maintained between the clamp 20 and arm 16, and the pump casing B is held against movement.

A hinged foot-support 22 is connected to the lower terminal of the upright 15, which is engaged by the foot of the operator for holding the receptacle against tilting.

In the operation of the apparatus, when the piston or plunger 4 is drawn upwardly the valve 3 of the pump casing is raised and the lubricant is drawn into the casing, and as the piston moves downwardly into the casing, the valve 3 is seated and the valve 6 of the piston is raised, allowing the lubricant above the valve 3 to pass through the passage 5 of the piston, thereby forcing the lubricant above the piston. When the piston is again drawn upwardly in the casing the lubricant above the piston will be forced out through the spout 11 and hose 12 to the articles or parts to be lubricated.

I claim:—

The combination with a receptacle, of an upright, an arm thereon, a bar parallel thereto, means for tightening the bar upon the upright for holding them in an adjusted position, a clamp rigidly affixed to one end of said bar and substantially at right angles thereto, adapted to be held against an edge of said receptacle for holding it rigidly, a pump casing slidably received in said clamp, means for holding said casing in said clamp, whereby tilting of the pump casing is prevented and a foot support pivotally connected to said upright so that in its normal open position it is in substantially the same plane as said arm, said pump casing adapted to press downwardly upon the bottom of the receptacle against said arm, whereby the receptacle is rigidly clamped to the up-right.

In testimony whereof I affix my signature, in the presence of two witnesses.

WM. H. DILLEY.

Witnesses:
ALEX ROBERTSON,
L. M. GREENWOOD.

Copies of this patent may be obtained for five cents each, by addressing the "Commissioner of Patents, Washington, D. C."